United States Patent [19]
Diel

[11] Patent Number: 4,796,860
[45] Date of Patent: Jan. 10, 1989

[54] VALVE SPOOL DETENT

[75] Inventor: Robert M. Diel, Hutchinson, Kans.

[73] Assignee: Eaton Corporation, Cleveland, Ohio

[21] Appl. No.: 109,050

[22] Filed: Oct. 16, 1987

[51] Int. Cl.⁴ ............................................. F16K 35/04
[52] U.S. Cl. ...................................... 251/297; 74/527
[58] Field of Search ........................... 74/527; 251/297

[56] References Cited

U.S. PATENT DOCUMENTS

| | | | |
|---|---|---|---|
| 3,218,882 | 11/1965 | Stephens et al. | 251/297 X |
| 3,285,284 | 11/1986 | Junck et al. | 137/624.27 |
| 3,386,312 | 6/1968 | Weasler | 74/527 X |
| 3,587,457 | 6/1971 | Morris | 74/527 X |
| 3,602,245 | 8/1971 | Meisel | 251/297 X |
| 3,608,586 | 9/1971 | Daggy, Jr. | 251/297 X |
| 3,712,151 | 1/1973 | Diehl | 74/527 |
| 3,776,062 | 12/1973 | Ito | 74/527 X |
| 4,185,661 | 6/1980 | Gill et al. | 251/297 X |

FOREIGN PATENT DOCUMENTS

| | | | |
|---|---|---|---|
| 2407136 | 8/1975 | Fed. Rep. of Germany | 251/297 |
| 2432109 | 2/1980 | France | 251/297 |

Primary Examiner—Gerald A. Michalsky
Attorney, Agent, or Firm—Edward L. Brown, Jr.

[57] ABSTRACT

A simplified valve spool detent device including a sleeve attached to the valve body surrounding an extending portion of the valve spool, the sleeve including a plurality of radially spaced holes therein in a common plane with a plurality of balls positioned in the holes, a c-shaped spring positioned outside the sleeve in spring contact with the sleeve, the extending portion of the spool including a cylindrical surface passing through the plane of the balls including a circumferential lug means in the form of a hardened wire ring seated in a circumferential groove in said cylindrical surface.

11 Claims, 1 Drawing Sheet

VALVE SPOOL DETENT

BACKGROUND OF THE INVENTION

Valve spool detents for manually positioned spool valves have been in existence since the early days of hydraulic valves. The prior art includes a wide variety of spring means for urging a ball against a lug or into a groove, as exemplified in the Meisel U.S. Pat. No. 3,602,245. Most of these prior art methods utilize some form of a compression coil spring which urges the ball directly into the detent or through a cam as exemplied in the FIGS. 4 through 7 of the last-mentioned patent. The usage of a c-shaped spring rather than a coil spring was done in the prior art in Stephens, et al, U.S. Pat. No. 3,218,882 and Daggy, U.S. Pat. No. 3,608,586. The last-mentioned patent to Daggy utilizes a c-spring on a pair of friction pads to apply a constant drag on the valve spool rather than a detent structure. The Stephens, et al patent does utilize a flat c-shaped spring for urging balls constantly outward against a detent groove.

SUMMARY OF THE INVENTION

The present invention defines a very simplified and inexpensive detent structure which applies no drag to the spool except at the point of engaging the detent or lug means. All of the above-mentioned patents provide a constant drag force on the spool in between detent positions, which diminishes the spool control in critical metering modes, as well as others. With the detent structure of the present invention there is no spring force transferred to the spool surface except when engaging the lug means, thus minimizing the amount of drag on the spool and lessens the chances for spool sticking. This design concept is possible because the spring force from the c-spring is being carried by the sleeve of the detent assembly.

The lug means on the valve spool or the stationary sleeve is typically formed by machining which then must be hardened to handle the problems of wear from the hard balls. The simplified construction of the present invention wire retaining ring eliminates the need for hardening since the retaining ring itself is already hardened during its normal manufacturing process. The elimination of this heat treating step comprises a substantial cost factor in the detent design.

The detent force produced by the c-shaped ring can be adjusted by the positioning of the c-spring longitudinally with respect to its contact point with the balls. The annular groove in the detent sleeve is sufficient wide to permit longitudinal movement of the c-spring while adjusting the location of the spacer rings on either side of the c-spring. When the c-spring is positioned off-center with respect to the contact point of the balls, the c-spring is deflected into a cone shape instead of a cylindrical shape with a much reduced spring force.

In the detent structure of the present invention, the only parts which require heat treating for hardening are the c-spring, the balls, and the wire retaining ring, all of which are previously hardened in their manufacturing process thus creating a substantial cost reduction.

A modified configuration of the present invention involves the utilization of a plastic dust cover as the spring means itself in valve configurations which do not include centering springs on the spool. The detent design of the present invention is very insensitive to misalignment of the spool and the detent sleeve due to the substantial clearance between the O.D. of the spool lug and the I.D. of the detent sleeve. The lug means may be shaped so that the detent maximum force occurs when the c-spring is deflected away from and not touching the detent sleeve. Therefore, detent sleeve concentricity in alignment with the spool have very little effect on the detent force.

It is therefore the object of the present invention to provide an improved valve spool detent structure which is simple in construction, cost effective, while being insensitive to concentricity problems between spool and housing.

A further object of the present invention is to provide a valve spool detent structure which eliminates the requirement of case hardening the lug means.

A further object of the present invention is to provide a valve spool detent structure with reduced drag on the spool for improved metering and spool control.

DESCRIPTION OF THE VIEWS

Figure 2:
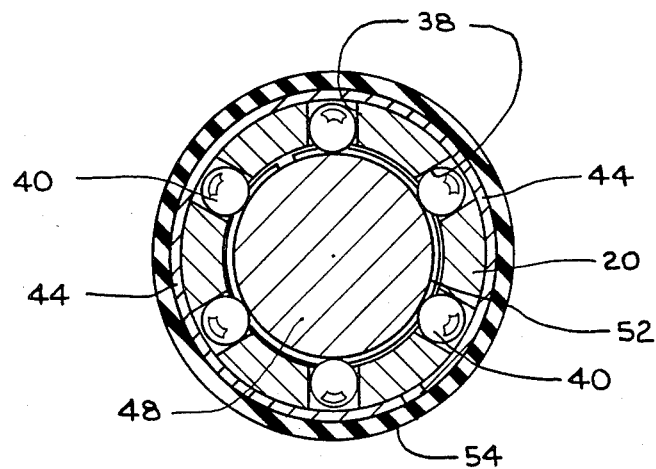
FIG. 2 is a sectional view taken along lines 2—2 of FIG. 1.

In describing the preferred embodiment of the invention illustrated in the drawings, specific terminology will be referred to for the sake of clarity. However, it is not intended to be limited to the specific terms so selected, and it is to be understood that each specific term includes all technical equivalents which operate in a similar manner to accomplish a similar purpose. The c-shaped springs, both flat and round, and the wire retaining rings can all be formed from a wide variety of steels currently in the marketplace which provide the necessary spring force or hardness for the valve design.

DESCRIPTION OF THE PREFERRED EMBODIMENTS

Figure 1:
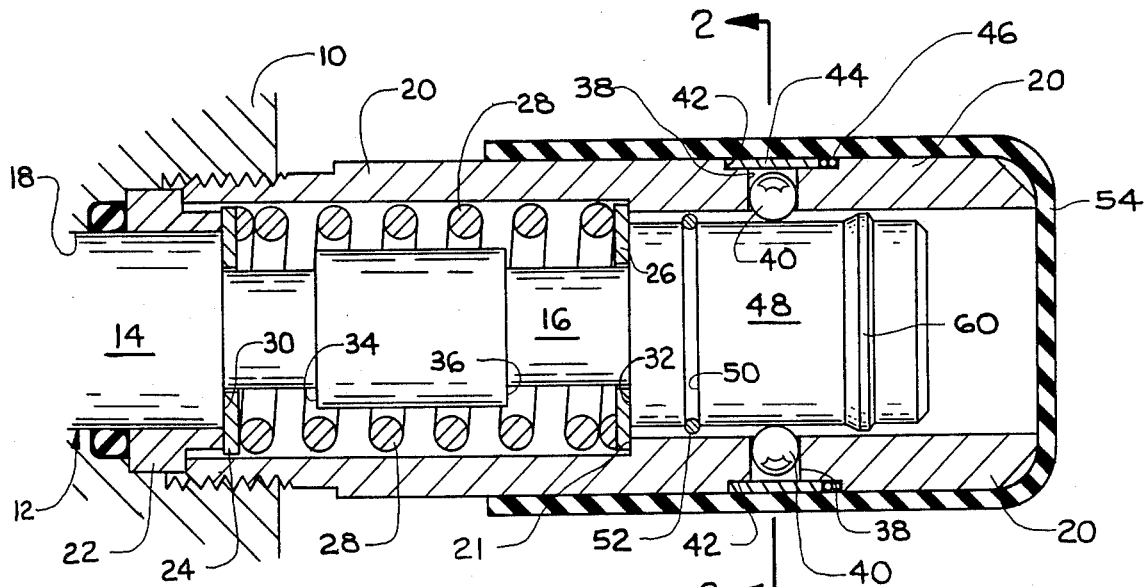
FIG. 1 is a longitudinal sectional view of portions of a spool valve and the accompanying detent structure illustrating the present invention.

With reference to FIG. 1 of the drawing, the detent structure of the present invention is shown attached to a conventional valve body 10 which includes a conventional valve spool 12 extending through a bore 18. The valving portions of the spool and adjacent cavities of the valve body have not been shown since they are not a part of the present invention and are commonly well-known in the prior art.

Valve spool 12 includes an inner portion 14, which is not shown in detail, joined with an outer portion 16 which includes a centering spring 28 and the detent structure which will be later described. The opposite end of the valve spool 12, which is not shown, is manually positioned by some form of handle which is not a part of the present invention. The valve spool 12 slides longitudinally in valve body bore 18 to its various positions which can include one or more detented positions depending upon the requirements of the valve design.

Located on the outer portion 16 is a centering compression spring 28 which is a commonly well-known design utilized in all types of spool valves. Centering springs urge the spool back to a center neutral position from spool positions to the right or the left of the FIG. 1 neutral position. As for example, if the spool 12 is shifted to the left, spacer sleeve 22, fixed at the valve body 10, begins to compress spring 28 through ring washer 24, while outer shoulder 32 on the spool compresses the spring from the opposite side through ring washer 26. This produces a rightward bias on the spool until it returns to its FIG. 1 position which is limited by sleeve shoulder 21. The detent mechanism of the present invention functions equally well on a valve spool without the centering spring mechanism just described.

Formed on the outer end of outer portion 16 is a cylindrical surface 48 which carries the lug means for holding the spool in the detented position. The lug means of the present invention is a wire retaining ring 52 positioned in a circumferential groove 50 cut in surface 48. Shown at the right end of cylindrical surface 48 is a second lug means 60, which is the conventional type of lug means utilized in the prior art. Lug 60 is formed while machining cylindrical surface 48 and requires heat treatment so that the lug can withstand the wear from the harder balls 40, as they ride thereover.

Wire retaining ring 52 is a c-shaped ring, as seen in FIG. 2, and is manufactured with sufficient hardness so that heat treating is not necessary.

Figure 3:
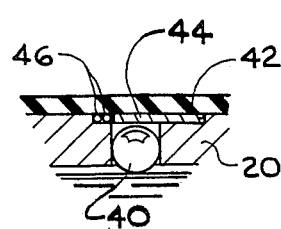
FIG. 3 is a partial sectional view similar to FIG. 1, with the c-spring in a different position.

The detent mechanism comprises a sleeve member 20 which is threadably attached to valve body 10. Sleeve 20 includes a plurality of radially spaced holes 38 all in a common plane, as best seen in FIG. 2. The holes 38 contain six steel balls 40, which freely slide back and forth in their respective holes. On the outside circumference of sleeve 20, approximate the holes 38 is an annular groove 42 for receipt of a c-shaped spring 44. The groove 42 contains all of the holes 38 as they exit the O.D. of sleeve 20. Ring 44 is flat in cross section with a width less than the width of groove 42. The remaining space in groove 42 is filled with a plurality of spacer rings 46, which permits the spring 44 to be moved longitudinally with respect to the position of the detent balls 40. FIG. 3 illustrates the spacer rings 46 on the left side of spring 44 so that the point of contact of the detent balls 40 is approximate the edge of spring 44. In this position, when the balls are forced outward, the c-spring 44 is deflected into a cone shape rather than the cylindrical shape when the spring 44 is centered over the ball 40, as shown in FIG. 1. By longitudinally moving the spring 44 relative to the balls 40, the spring force can be varied with the minimum spring force being achieved with the spring 44 offset to the side as illustrated in FIG. 3. The slot 42 could have greater width so that the spring could be further offset from its point of contact with the balls 40 and an even lesser spring force was achieved.

Figure 4:
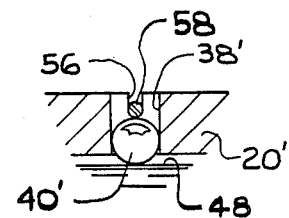
FIG. 4 is a partial sectional view, similar to FIG. 3, illustrating an alternate c-spring construction.

A modified c-shaped spring design is illustrated in FIG. 4 wherein the spring 58 is round in cross section and is engaged in a narrow circumferential groove 56 located in the center of each hole 38. Groove 56 is sufficiently shallow so there is no spring force applied to balls 40' or in turn cylindrical surface 48. This prevents any drag from the detent means on spool 12 until the lug means is engaged by the balls 40'. The resistance of c-spring 58 can be varied by diameter size and material.

Figure 5:
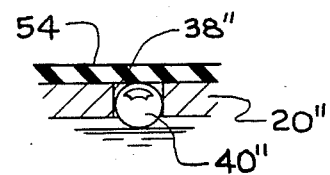
FIG. 5 is a partial sectional view, similar to FIG. 3, illustrating a further alternative spring mechanism according to the present invention.

FIG. 5 illustrates still a further form of spring means wherein detent sleeve 20" is encapsulated by a plastic dust cover 54 which itself functions as a spring when the ball 40" pushes outward as it rides over the lug means. Utilizing the plastic dust cover 54 as a spring is not feasible with valves utilizing centering springs since the load from the centering spring while in the detented position would cold-flow the plastic.

OPERATION

With the valve spool 12, as shown in the FIG. 1 position, there is no spring force from c-spring 44 which is transferred to the valve spools since the spring load is carried by sleeve 20 and balls 40 have adequate clearance between the inside diameter of spring 44 and spool surface 48.

There are a variety of valve spool working positions short of the detented positions which have no drag on the spool from the detent structure in light of the above-mentioned loose fit. As the valve spool 12 is shifted in a rightward direction, c-spring 44 is not deflected until wire ring 52 comes in contact with balls 40, urging them outward into contact with c-spring 44. Once ring 52 passes the center of balls 40, spool 12 will be held in its detented position until an overriding force to the left is applied.

The resistance force of c-spring 44 can be varied by longitudinally sliding c-spring 44 to the right or left relative to its contact plane with balls 40. Six detent balls 40 are provided since c-spring 44 has an open area which at some time might receive one of the balls. With five detent balls still functioning, the detent mechanism and its deflection force remains substantially unchanged.

In the FIG. 5 embodiment, the holding force which retains spool 12 in its detented position is provided by the deformation of plastic dust cover 54 as all six balls 40" are urged outward against cover 54. Utilizing cover 54 as a spring, of course, has limitations as to temperature range and duration of holding force due to the characteristics of plastic.

It is to be understood that while the detailed drawings and specific examples give and describe preferred embodiments of the invention, they are for purposes of illustration only, that the apparatus of the invention is not limited to the precise details and conditions disclosed and that various changes may be made therein without departing from the spirit of the invention which is defined by the following claims.

I claim:

1. A valve spool detent device, comprising the combination of:
    a valve body having a first bore therein;
    a valve spool slidably positioned in the first bore having inner and outer portions, the force for operating the valve being applied to the inner spool portion;
    a detent assembly surrounding the outer spool portion including a sleeve attached to the body, the sleeve including a plurality of radially spaced holes therein in a common plane;
    a plurality of balls positioned in the holes of the sleeve;
    a c-shaped adjustable bias spring means positioned on the outside of the sleeve covering each of the radial holes in said sleeve;
    the outer portion of the spool including a cylindrical surface passing through said plane including a circumferential outwardly extending lug means which engages the plurality of balls and c-spring as the lug means approaches said plane.

2. A valve spool detent device as set forth in claim 1, wherein the lug means comprises a hardened wire ring seated in a circumferential groove, the groove being located in the cylindrical surface.

3. A valve spool detent device as set forth in claim 1, wherein the lug means comprises a hardened wire c-shaped ring seated in a circumferential groove, the groove being located in the cylindrical surface.

4. A valve spool detent device as set forth in claim 1, wherein the detent assembly sleeve includes an annular groove for receipt of the c-shaped spring, the annular groove having greater longitudinal width than the c-spring; further including spacer means insertable in the annular groove on either side of the c-spring to shift the c-spring's position relative to the contact point with the balls whereby the spring force can be varied.

5. A valve spool detent device as set forth in claim 1, wherein the balls, sleeve and c-spring are sized whereby the balls are free of spring loading except when the lug means comes in contact with said balls.

6. A valve spool detent device as set forth in claim 1, wherein the c-shaped spring is flat in cross section with substantial width, further including an annular groove in the cylindrical surface of the spool, the width of the annular groove being greater than the c-shaped spring which in turn is inserted in the groove; whereby the spring force on the balls can be varied by moving the spring longitudinally relative to the balls.

7. A valve spool detent device as set forth in claim 1, wherein the c-shaped spring is round in cross section, further including an annular groove in the cylindrical surface of the spool approximate said common plane for receipt of the c-shaped spring, the width of the annular groove being less than the diameter of the balls.

8. A valve spool detent device as set forth in claim 1, wherein the c-shaped spring is flat in cross section with substantial width, further including an annular groove in the cylindrical surface of the spool for receipt of the c-shaped spring, the width of the annular groove being greater than the width of the c-shaped spring, and spacer means insertable in the annular groove on either side of the c-spring to position the spring.

9. A valve spool detent device as set forth in claim 1, wherein the detent assembly has between four and six holes and balls.

10. A valve spool detent device, comprising the combination of:
a valve body having a first bore therein;
a valve spool slidably positioned in the first bore having inner and outer portions, the force for operating the valve being applied to the inner spool portion;
a detent assembly surrounding the outer spool portion including a sleeve attached to the body, the sleeve including a plurality of radially spaced holes therein in a common plane;
a plurality of balls positioned in the holes of the sleeve;
an adjustable biasing means positioned on the outside of the sleeve covering each of the radial holes in said sleeve;
the outer portion of the spool including a cylindrical surface passing through said plane including a circumferential outwardly extending lug means which engages the plurality of balls and bias means as the lug means approaches said plane.

11. A valve spool detent device as set forth in claim 10, wherein the bias means is a resilient dust cap positioned over the detent device.

* * * * *